US012453635B2

United States Patent
Link et al.

(10) Patent No.: US 12,453,635 B2
(45) Date of Patent: Oct. 28, 2025

(54) JOINT IMPLANT FOR ADMINISTERING A PHARMACEUTICAL PRODUCT

(71) Applicant: WALDEMAR LINK GmbH & Co. KG, Hamburg (DE)

(72) Inventors: Helmut D. Link, Hamburg (DE); Hans-Joachim Fischer, Norderstedt (DE)

(73) Assignee: WALDEMAR LINK GmbH & Co. KG, Hamburg (DE)

( * ) Notice: Subject to any disclaimer, the term of this patent is extended or adjusted under 35 U.S.C. 154(b) by 757 days.

(21) Appl. No.: 17/626,017

(22) PCT Filed: Jul. 9, 2020

(86) PCT No.: PCT/EP2020/069359
§ 371 (c)(1),
(2) Date: Jan. 10, 2022

(87) PCT Pub. No.: WO2021/005152
PCT Pub. Date: Jan. 14, 2021

(65) Prior Publication Data
US 2022/0249238 A1  Aug. 11, 2022

(30) Foreign Application Priority Data

Jul. 11, 2019 (EP) .................................... 19185710

(51) Int. Cl.
*A61F 2/30* (2006.01)
*A61F 2/38* (2006.01)
*A61F 2/46* (2006.01)

(52) U.S. Cl.
CPC .... *A61F 2/384* (2013.01); *A61F 2002/30367* (2013.01); *A61F 2002/30387* (2013.01);
(Continued)

(58) Field of Classification Search
CPC ............ A61F 2/384; A61F 2002/30367; A61F 2002/30387; A61F 2002/30405;
(Continued)

(56) References Cited

U.S. PATENT DOCUMENTS

| 4,219,893 A | 9/1980 | Noiles |
| 10,729,841 B2 | 8/2020 | Vogt et al. |

(Continued)

FOREIGN PATENT DOCUMENTS

| EP | 3216425 A1 | 9/2017 |
| EP | 3542759 A1 | 9/2019 |

OTHER PUBLICATIONS

International Search Report and Written Opinion mailed Aug. 31, 2020 in corresponding International Application No. PCT/EP2020/069359 and the English Translation of the International Search Report.

(Continued)

*Primary Examiner* — Leslie A Lopez
(74) *Attorney, Agent, or Firm* — Chiesa Shahinian & Giantomasi PC (57) ABSTRACT

A joint implant component (1, 1'; 101; 201) for administering a pharmaceutical product is disclosed, which comprises an implant shaft (10, 10'; 110; 210), a joint section (20, 20'; 120; 220) arranged at the proximal end of the implant shaft, a flush supply opening (3, 3'; 103; 203) and a backflush opening (4, 4'; 104; 204). At least one shaft flush channel (11, 11'; 111; 211) and one shaft backflush channel (12, 12'; 112; 212) extend along the implant shaft inside the implant shaft. The shaft flush channel is connected to the outside of the implant shaft via shaft flush holes (13, 13'; 112; 113) for discharging the pharmaceutical product, and the shaft backflush channel is connected to the outside of the implant shaft via at least one shaft backflush hole (14, 14'; 114; 214)

(Continued)

for receiving the discharged pharmaceutical product. The flush supply opening is fluidically connected to the proximal end of the shaft flush channel and the backflush opening is fluidically connected to the proximal end of the shaft backflush channel. Also disclosed is a joint implant comprising two such joint implant components which are connected to one another by means of joint surface parts (30, 40; 230) and are pivotable relative to one another.

16 Claims, 8 Drawing Sheets

(52) U.S. Cl.
 CPC .............. *A61F 2002/30405* (2013.01); *A61F 2002/30433* (2013.01); *A61F 2002/30492* (2013.01); *A61F 2002/30507* (2013.01); *A61F 2002/30593* (2013.01); *A61F 2002/30672* (2013.01); *A61F 2002/3068* (2013.01); *A61F 2002/30827* (2013.01); *A61F 2002/4631* (2013.01)

(58) Field of Classification Search
 CPC .. A61F 2002/30433; A61F 2002/30492; A61F 2002/30507; A61F 2002/30593; A61F 2002/30672; A61F 2002/3068; A61F 2002/30827; A61F 2002/4631
 See application file for complete search history.

(56) References Cited

U.S. PATENT DOCUMENTS

| 2010/0217401 | A1* | 8/2010 | de Beaubien | ............. A61F 2/38 |
| | | | | 623/20.36 |
| 2013/0149669 | A1* | 6/2013 | Fostick | ................. A61C 19/06 |
| | | | | 433/174 |
| 2014/0194811 | A1* | 7/2014 | Barsoum | ................ A61B 17/72 |
| | | | | 604/35 |
| 2016/0367371 | A1* | 12/2016 | de Beaubien | ............. A61F 2/34 |
| 2019/0290833 | A1 | 9/2019 | Vogt et al. | |

OTHER PUBLICATIONS

Communication according to Article 94(3) EPC mailed Apr. 18, 2023 in connection with European Patent Application No. 19185710.1, filed Jul. 11, 2019, 14 pages (including translation).

* cited by examiner

JOINT IMPLANT FOR ADMINISTERING A PHARMACEUTICAL PRODUCT

CROSS-REFERENCE TO RELATED APPLICATIONS

This application is the National Stage entry under 35 U.S.C. § 371 of International Application No. PCT/EP2020/069359, filed Jul. 9, 2020, published on Jan. 14, 2021 under Publication Number WO 2021/005152 A1, which claims the benefit of priority under 35 U.S.C. § 119 of European Patent Application Number 19185710.1 filed Jul. 11, 2019, the entireties of which are herein incorporated by reference.

FIELD OF THE INVENTION

The invention relates to a joint implant component for administering a pharmaceutical product. The invention furthermore relates to a pivotable joint implant for administering a pharmaceutical product, which comprises a first joint implant component and a second joint implant component for administering a pharmaceutical product.

PRIOR ART

Joint implants have proven successful as replacements for joints that are no longer functioning normally and are a routine operation. However, the size of joint implants means that the implantation thereof is still quite a major surgical procedure. During such a procedure, an implant, which has a relatively large surface area, is inserted into a patient's body. This implant surface is exposed to the environment prior to implantation, making it difficult to ensure absolute sterility at the surgical site.

Consequently, an infection may occur in the region of a treated joint. In addition to the aforementioned hygiene risk factors, there are also patient-specific risk factors that may cause such an infection. Even though infections are relatively rare, the occurrence of an infection places a great strain on the individual patients affected.

Infections of the aforementioned type are usually combated by administering active substances such as antibiotics. Such a treatment may also be carried out as a preventive measure, in particular in the case of high-risk patients. The active substances are released directly at the implantation site. Collagen sponges, fleeces or chains of bone cement beads, which contain an active substance that is gradually released in order to fight or prevent inflammation, are, for example, used for this purpose. If the treatment does not bring about the desired effect, revision of the previously implanted joint implant may be necessary. The same also applies in the case of tissue growth, such as a tumour.

During revision surgery, the joint implant disposed inside the body is removed again so as to be able to better treat the inflamed area. As a result of the explantation, part of the supporting apparatus is missing, which significantly limits the patient's mobility and also leads to a shortening of the surrounding soft tissue. However, immediate reimplantation in order to prevent such an effect is not possible since the infection must completely subside beforehand.

To prevent shortening of the soft tissue, a procedure was therefore developed in which the empty space resulting due to explantation is partially filled with bone cement. For this purpose, the bone cement mixed in the operating theatre is adapted to the cavity to be filled whilst still in the plastic state. To ensure optimal adaptation of such a bone cement spacer, the bone cement is modelled taking into consideration the patient's remaining bone tissue. However, since the bone cement has not yet hardened when it is in the plastic state and thus an endothermic hardening reaction continues to take place therein, there is a risk of damage to the surrounding tissue, up to and including necrosis, due to temperatures that are too high. Furthermore, if the active substance is supposed to be released via the bone cement, the heat may also have a negative effect on the active substance.

Despite such a use of a bone cement spacer, the patient must still be immobilised since the material properties thereof and the mechanical bond to the remaining bone tissue are inadequate despite modelling. Bone cement is thus essentially a material that occupies the space of the removed joint implant and dissected bone, but is mechanically incapable of enabling mobilisation of the patient. In conclusion, a bone cement spacer therefore cannot replace either the support function or the mobility of the explanted joint replacement. Consequently, the soft tissue contracture, muscle atrophy and bone weakening caused by immobilisation can only be counteracted to a limited extent even if a spacer is used.

Following revision of the joint replacement, it was therefore proposed to use a placeholder implant that delivers an active substance supplied via infusion tubes to the affected joint area and administers it there. For example, U.S. Pat. No. 9,707,008 B2 discloses a placeholder implant for the knee joint region that comprises a hollow coupling piece at the level of the former knee joint, to which hollow intramedullary rods for the tibia and femur are attached on opposite sides. An active substance supplied to the coupling piece can be guided into the rods through openings suitably arranged across the coupling piece and delivered to the surrounding tissue at the distal ends thereof. The intramedullary rods may also comprise longitudinal grooves on the outer surface thereof in order to return, on the outside of the respective intramedullary rod, the active substance into the cavity of the coupling piece through openings therein and thus circulate the active substance.

Even though the ligament apparatus is kept under tension by the placeholder implant of U.S. Pat. No. 9,707,008 B2, this does not mean that the patient has any mobility since the intramedullary rods of the placeholder implant are merely inserted into the bone. Furthermore, the supply and circulation of the active substance depends on the outer longitudinal grooves being able to be kept clear following insertion of an intramedullary rod. There is still a risk that infectious material will be circulated in the region of the joint and thus unintentionally distributed.

SUMMARY OF THE INVENTION

Consequently, one object was to improve the supply of an inflamed tissue area with an active substance following revision of a joint replacement. A further object was to counteract any spread of the inflamed area. Following removal of the joint replacement affected by the infection, the patient should furthermore be allowed some degree of mobility by means of an appropriate replacement.

In view of these objects, a joint implant component for administering a pharmaceutical product is provided, which comprises an implant shaft, a joint section arranged at the proximal end of the implant shaft, a flush supply opening and a backflush opening. At least one shaft flush channel and one shaft backflush channel extend along the implant shaft inside the implant shaft. The shaft flush channel is connected to the outside of the implant shaft via shaft flush holes for discharging the pharmaceutical product, and the shaft backflush channel is connected to the outside of the implant shaft via at least one shaft backflush hole for receiving the discharged pharmaceutical product. The flush supply opening is fluidically connected to the proximal end of the shaft flush channel. The backflush opening is fluidically connected to the proximal end of the shaft backflush channel.

Such a joint implant component constitutes an interim implant that can be temporarily implanted as a replacement for a standard joint implant in order to treat an inflamed area of tissue. During the treatment period, this joint implant component allows the patient a limited degree of mobility in addition to the treatment. This mobility in particular prevents muscle weakness caused by a lack of movement as well as an excessive shortening of the ligament apparatus. If the inflamed standard joint implant component is not replaced, such a shortening of the ligament apparatus may otherwise occur owing to the cavity created as a result of explantation.

In order to be able to better mobilise the patient with the aid of the implant component, the joint implant component is preferably fixable in the region of the cement contact surfaces by means of bone cement in a manner that protects the bone to the greatest possible extent.

It is possible to configure the joint implant component such that it interacts with a corresponding standard joint implant component disposed opposite thereto in a manner similar to the previously explanted standard joint implant component. In other words, the joint implant component may replace the infected side of a standard joint implant in such a manner that the joint section of the joint implant component interacts with a joint section of the opposite standard joint implant component.

In the present context, a standard joint implant component is to be understood as a joint implant component that is configured to take over the role of a native joint in the long term and is consequently not configured with a supply of pharmaceutical product.

The shaft flush channel and the shaft flush holes enable a targeted administration of an active substance, in particular an anti-inflammatory agent such as an antibiotic. Furthermore, fluid and other residues can be removed from the inflamed area via the shaft backflush hole and the shaft backflush channel, i.e. drainage of the inflamed area can be performed. The fluid and other residues will be referred to in the following simply as drainage fluid. Such drainage at least helps to clean the inflamed area and thus to fight the infection more quickly. Drainage also prevents further spread of the infection.

The shaft flush channel and the shaft backflush channel are both closed or tubular channels. In the case of the implant, the pharmaceutical product is accordingly discharged (exclusively) via the shaft flush holes. Similarly, the drainage fluid is received in the shaft region of the implant (exclusively) via the at least one shaft backflush hole. Discharge of the pharmaceutical product and reception of the drainage fluid therefore both occur in a more targeted and controlled manner. The joint implant component is in particular configured such that discharge of the pharmaceutical product and reception of the drainage fluid can occur simultaneously.

By providing the shaft flush holes and the at least one shaft backflush hole in the shaft region of the joint implant component, which, in the implanted state, is located in the cavity of the bone tissue caused by explantation, an infection can be treated locally in a targeted manner.

In one embodiment, the implant shaft and the joint section each comprise a connecting portion that is preferably provided with a thread, by means of which they can be mounted together.

In this embodiment, it is accordingly possible to modularly adapt the joint implant component to the anatomical situation of a patient. The implant shaft with the shaft flush holes can in particular be adapted to the explantation cavity present in the bone tissue. The implant shaft is selected such that there is a gap between the outer surface of the shaft and the bone tissue. The pharmaceutical product can then be supplied to the inflamed area in this gap. The joint section is similarly selected, where necessary, to cooperate with an aforementioned corresponding joint section that may be present, and the opposite sides of joint thus form a pivotable joint.

Since the joint implant component is only temporarily inserted into the bone tissue, i.e. for the duration of treatment of the infection, the connecting portion of the implant shaft and the connecting portion of the joint section are preferably designed as a threaded connection. This is particularly cost-effective. Furthermore, such a connecting portion allows the joint implant to be both quickly and easily mounted and quickly and easily dismounted again.

It is alternatively or additionally also possible to provide the connecting portion as a conical connection. Such a conical connection may have a sealing function.

In a preferred embodiment, the at least one shaft backflush hole defines a backflush path and each shaft flush hole defines a flush path, the backflush path having a different orientation to the flush path and the orientations between each of the shaft flush holes and the at least one shaft backflush hole differing preferably by 45° to 90° and more preferred by 60° to 90°.

The flush path and the backflush path are essentially defined by the central axes of the shaft flush holes and the central axis of the at least one shaft backflush hole, respectively.

In other words, the implant component in this embodiment is configured such that the shaft flush holes discharge the pharmaceutical product in directions that differ from the direction in which the at least one shaft backflush hole receives the drainage fluid. This has the advantage that, in the case of drainage, a supplied pharmaceutical product is not immediately removed from the area of infection again; rather, a certain dwell time of the pharmaceutical product and thus its effect can be ensured. The dwell time is longest in the case of passive drainage and can be shortened by active drainage. In the case of active drainage, the drainage fluid is removed again via the backflush opening by means of negative pressure.

It is particularity preferred for the at least one shaft backflush hole to be located in a different section of the implant shaft to the shaft flush holes. For example, the at least one shaft backflush hole may be located in a distal region, in particular at the distal end of the implant shaft, whereas the shaft flush holes are located around the circumference of the implant shaft, in particular at least in the central and/or proximal region of the implant shaft. It is alternatively or additionally also possible to provide the at least one shaft backflush hole at a different location in the circumferential direction of the implant shaft to the shaft flush holes.

In a particularly preferred embodiment, the joint implant component comprises an anchoring portion proximal to the shaft flush holes, which comprises an anchoring surface via which the joint implant component can be anchored, in particular by means of bone cement. The anchoring surface of the joint implant component preferably extends substantially in a direction transverse to the longitudinal axis of the implant shaft, i.e. transverse to the implantation direction of the joint implant component.

This embodiment allows the joint implant component to be anchored sufficiently firmly to ensure at least a limited degree of mobility, and also defines the treatment area for the pharmaceutical product in the region of the implant shaft. In particular, at least part of the implant shaft comprising the shaft flush holes and the at least one shaft backflush hole is hereby disposed in the recess of the bone tissue in the implanted state and is sealed at the level of the anchoring portion. A treatment area in the region of the implant shaft consequently results with this embodiment, in which the infection can be combated in a more spatially targeted and efficient manner.

Furthermore, if the anchoring surface is transversely oriented, removal of the implant component is simplified since the connection between the bone tissue and the bone cement is easily accessible and thus easily separable.

The anchoring portion is furthermore preferably provided on a surface of the joint section which, as described above, even more preferably extends in a direction transverse to the longitudinal axis of the implant shaft. The anchoring surface thereby faces the distal side of the joint implant component.

If bone cement is used, this arrangement of the anchoring portion on the other hand prevents the bone cement from blocking the shaft discharge holes or the at least one shaft backflush hole.

In one embodiment, the surface of the anchoring portion comprises a surface structure, in particular ribs and/or grooves, to support anchoring of the implant.

Such a surface structure increases the contact surface with the bone cement. It may be configured to at least prevent relative movement along the anchoring surface of the anchoring portion by means of a form fit. It should be noted that the use of bone cement to anchor the implant component is preferred since such an anchoring can reliably and quickly mobilise the patient in the case of the present joint implant component. This mobilisation means both a gain in quality of life as well as improved therapy options in respect of the musculoskeletal system.

In a preferred embodiment, the backflush opening is provided in the joint section and the joint section comprises a joint section backflush passage connecting the backflush opening to the shaft backflush channel.

In this manner, drainage fluid is removed from the area of infection via the at least one shaft backflush hole, the shaft backflush channel, the joint section backflush passage and the backflush opening by means of active or passive drainage. In the case of active drainage, negative pressure is applied to the backflush opening, which suctions the drainage fluid, whereas in the case of passive drainage, fluid is transported to the backflush opening by means of positive pressure, gravity, the principle of communicating tubes or capillary action in order to remove the drainage fluid from the patient's body. In both cases, this arrangement of a backflush opening has the advantage that the removed fluid is extracted in the region of the access used for implantation of the joint implant component and consequently no further access needs to be created.

In a further preferred embodiment, the flush supply opening is provided in the joint section and the joint section comprises a joint section flush passage connecting the flush supply opening to the shaft flush channel.

In this embodiment, the pharmaceutical product is supplied to the inflamed area at the level of the implant shaft via the supply opening, the joint section flush passage, the shaft flush channel and the shaft flush holes. As in the case of the backflush opening, this arrangement also has the advantage of the implantation access that is already present at this location.

In a preferred embodiment, the joint section comprises joint section flush holes connected to the flush supply opening of the joint implant component.

This embodiment also makes it possible to fight an infection in the region of the joint or to prevent the spread of an infection into this area. These joint section flush holes are preferably arranged such that they are not blocked by articulation of the joint and remain open to the surrounding area of the implant. The joint section flush holes are accordingly preferably arranged such that they define a flush path oriented substantially perpendicular to the longitudinal axis of the implant shaft.

In one embodiment, the joint section flush passage comprises at least one branch that connects the flush supply opening to the shaft flush channel and/or the joint section flush holes.

The at least one branch serves to supply the pharmaceutical product to both the shaft flush channel and the joint section flush holes. For example, a branch may divide the flow of pharmaceutical product between the shaft flush channel and at least one joint section flush hole. In addition, at least one further branch may be provided, which is downstream of the previous branch and guides the flow of pharmaceutical product to a plurality of joint section flush holes. The distribution of the flow of pharmaceutical product and thus the administration of the pharmaceutical product can also be controlled via the number of outgoing arms of a branch as well as the arrangement of the at least one branch.

In a particularly preferred embodiment, the joint section flush passage has different cross-sectional areas for controlling the distribution of the pharmaceutical product between the shaft flush channel and the joint section flush holes.

In this embodiment, the distribution of the volume flow containing the pharmaceutical product is defined by means of a targeted selection of the cross-sectional areas of the arms extending from the at least one branch. For example, a larger cross-sectional area is preferably selected for the arm guiding the pharmaceutical product into the shaft flush channel than is selected for the cross-sectional area leading to the joint section flush holes. It is consequently preferred to configure the cross-sectional areas such that a greater proportion of the flow of pharmaceutical product is supplied to the shaft flush channel.

In a further preferred embodiment, the shaft flush holes have different cross-sectional areas to one another for controlling discharge of the pharmaceutical product.

Different cross-sectional areas may therefore be provided between the shaft flush holes. It is, for example, possible to provide the shaft flush holes that are further away from the flush supply opening with a larger cross-sectional area than the shaft flush holes that are closer to the flush supply opening. This allows a more uniform discharge of the pharmaceutical product via the shaft flush holes formed in this manner. In this context, the terms "further away" and "closer" refer to the distance to the flush supply opening within the joint implant component.

Such a configuration of cross-sectional areas and/or branches is possible for all receiving holes and/or discharge holes. For example, something similar may apply to the cross-section of the flow path, via which drainage fluid received through the at least one shaft backflush hole is guided out of the implant component.

It is furthermore particularly preferred that the at least one shaft backflush hole has a larger cross-section than each of the shaft flush holes. Clogging of the return flow path by residues from the infected area is prevented in this manner. The minimum cross-section of the return path is in particular 2, 3 or 5 times up to 10 or 15 times greater than the minimum cross-section of the flush supply path.

In a particularly preferred embodiment, the joint section comprises an attachable joint element for articulation with another joint implant component.

Instead of an integrally configured joint surface, the joint section in this embodiment comprises an attachable joint element that in turn provides a joint surface for articulation with another joint implant component. This embodiment allows an even better adaptation of the joint section and also allows an implantation in which the joint surface of the joint implant component is only mounted once the implant shaft has been inserted into the recess in the bone tissue.

Further provided is a joint implant comprising two joint implant components, the first joint implant component comprising a first joint surface and the second joint implant component comprising a second joint surface, the joint surfaces of the first and second joint implant components being configured complementary to one another and being pivotable relative to one another when in contact with each other.

In such a joint implant, both sides of the joint are replaced with joint implant components that allow supply of a pharmaceutical product. As in the case of a single joint implant component, an existing infection or inflammation of surrounding tissue is treated in a targeted and efficient manner, albeit on both sides. At the same time, increased patient mobility is achieved since the first and second joint implant components are pivotable relative to one another.

In one embodiment, the first joint surface and/or the second joint surface is configured as part of a first or second attachable joint element, respectively, with a hinge pin preferably forming the first joint surface and a through-hole forming the second joint surface.

As described above, such an embodiment allows an increased adaptability to a patient's situation and easier implantation of the joint implant components.

The joint implant of this embodiment is preferably designed as a hinged joint with a hinge pin and a receptacle for the hinge pin. Such a joint has a simple structure and is robust enough to allow the patient improved mobility.

One of the joint implant components may furthermore comprise an arthrodesis pin and the other of the joint implant components may comprise an arthrodesis pin receptacle, the arthrodesis pin being insertable into the arthrodesis pin receptacle to lock the joint implant components preferably in an extended position.

Locking of the joint implant leads to arthrodesis and thus immobilisation of the joint, as a result of which the surrounding tissue can be protected. The arthrodesis pin can preferably be inserted into the joint section transversely, in particular substantially perpendicularly, to the longitudinal axis of the implant shaft. This makes it possible, where necessary, to immobilise the joint via arthrodesis or to release it again.

In a particularly preferred embodiment of the joint implant, the second joint element comprises an insertion portion that is insertable into an insertion opening and a guide portion comprising an undercut, the insertion opening and the guide portion being formed in the second joint implant component on a side facing the first joint implant component, and the second joint implant component preferably comprising a locking device that locks the insertion portion inserted into the guide portion.

Since the joint element can be inserted, by means of an insertion portion, into a recess formed by an insertion opening and a guide portion. The guide portion comprises an undercut, via which simple coupling of the joint element to the corresponding joint section is possible. Once the insertion portion is inserted into the insertion opening, the joint element can be guided under the undercut. If the insertion portion is arranged at least partly in the undercut, the joint element is locked in the direction opposite to the insertion direction. By means of the locking device, it is thereby possible to prevent unintentional release of the second joint element.

BRIEF DESCRIPTION OF THE FIGURES

With the aid of the following figures and description, embodiment examples will now be described in more detail in order to provide a better understanding of the present invention. The features apparent in the figures are provided with reference numbers for this purpose. Substantially the same reference numbers are used for the different embodiment examples provided that the features of these embodiment examples are similar or achieve a similar effect.

FIG. 3b shows an embodiment of a joint section of a further joint implant component that can be combined with the joint implant component of FIG. 3a;

DETAILED DESCRIPTION OF PREFERRED EMBODIMENTS

Figure 1:
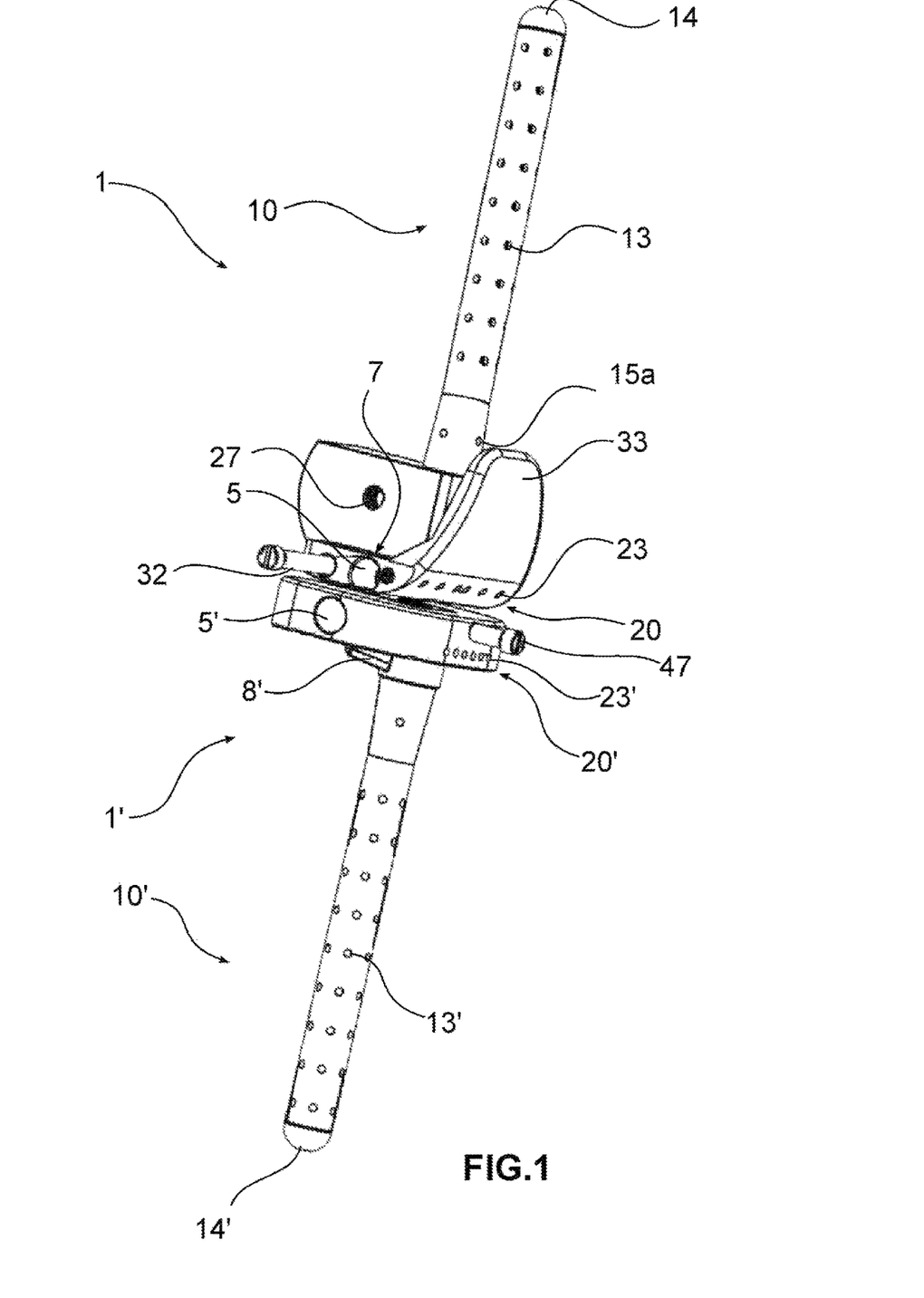
FIG. 1 shows a first embodiment of a joint implant in the extended state, which is configured for administration of a pharmaceutical product.

FIG. 1 shows a first embodiment of a joint implant that is configured for administration of a pharmaceutical product to an inflamed area and for drainage of the inflamed area. Once it has been implanted, such a joint implant, which comprises the joint implant components 1 and 1' shown in the figure, can therefore be used to treat inflamed tissue in the vicinity of the joint implant. A pharmaceutical product that is effective against the infection and/or the consequences thereof can be supplied for this purpose by means of a channel system within the joint implant components 1, 1'. Examples of such pharmaceutical products are anti-inflammatory drugs and antibiotics.

The pharmaceutical product is transported in dissolved form or as a suspension to the inflamed area via the channel system of the joint implant. By means of drainage, drainage fluid can furthermore be removed from the inflamed area via a further channel system within the joint implant components 1, 1'. The drainage fluid contains residue from the inflamed area, and thus a systemic spread of the infection can be prevented with joint implant components 1, 1'.

The embodiment of a joint implant that is shown by way of example in FIG. 1 is intended as a replacement for a standard implant that is completely explanted due to an infection and in order to treat the infection.

Instead of total replacement, it is also possible to replace just one side of a standard joint implant with a joint implant component for administering a pharmaceutical product. The joint section is thereby adapted to the implant component of the standard joint implant that has not been removed so that the function of the artificial joint can essentially be retained. This can provide the patient with mobility, which on the one hand can support therapy and on the other hand enables the patient to perform simple movements.

The example of a joint implant shown in FIG. 1, which comprises joint implant components 1, 1', is intended as a replacement for a standard knee joint implant. Joint implant component 1 thereby replaces the femoral knee joint component and joint implant component 1' replaces the tibial knee joint component of the standard joint implant. The structural configuration and/or function of the two joint implant components 1 and 1' is substantially the same in parts. For this reason, the two joint components are generally referred to simultaneously in the following. In addition, features of related joint implant components having the same structural configuration and/or function are generally identified in the following using the same reference number with and without an apostrophe.

Figure 7:
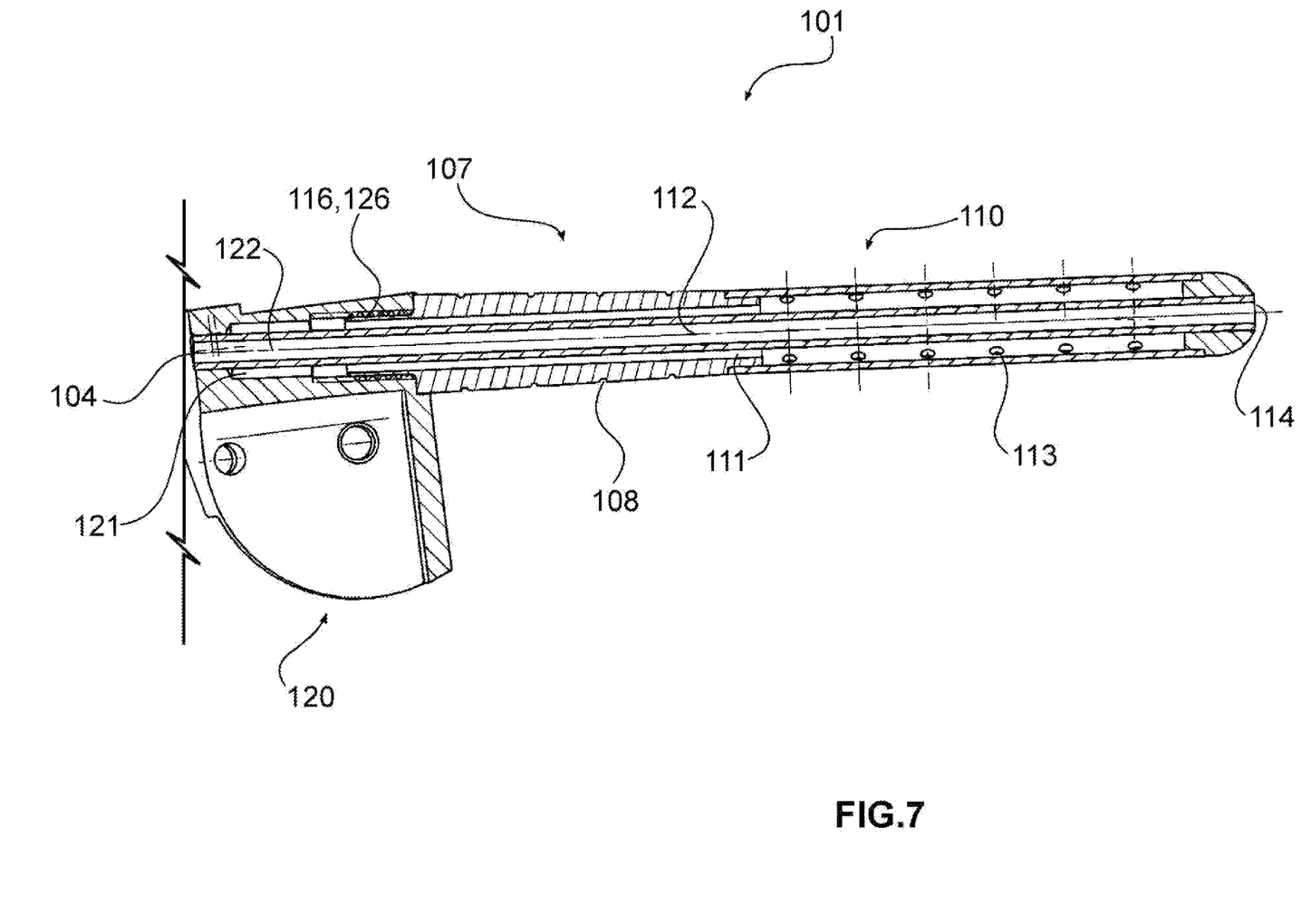
FIG. 7 is a sectional view of yet another embodiment of a joint implant component for discharge and return of a pharmaceutical product.

Joint implant components configured as a temporary replacement for a standard joint implant can, of course, also be used to replace implant components of standard joint implants of other joints. For example, an embodiment is described below with reference to FIGS. 7*a* and 7*b*, in which a joint implant component 101 is configured for the temporary treatment of the femoral implant component of a standard hip joint implant that is not shown. In other words, the present disclosure can be applied to joint implant components of various joints, such as joint implant components of knee joints, hip joints, shoulder joints, elbow joints, ankle joints, wrist joints, or spinal column joints.

The joint implant components 1, 1' shown in FIG. 1 each comprise an implant shaft 10, 10' and a joint section 20, 20'. The implant shaft 10, 10' and the joint section 20, 20' may substantially be configured integrally, but are preferably detachably connected to one another via a connecting portion 16 (see FIG. 4). As described above and shown in FIG. 4, the connecting portion 16 of the implant shaft 10, 10' and the connecting portion 26 of the joint section 20, 20' may be provided with a thread (FIGS. 4*b* and 5*b*). Accordingly, the implant shaft 10, 10' and the joint section 20, 20' can be mounted and dismounted via a threaded connection. As already explained above, a conical connection may alternatively or additionally be used, which may also have a sealing function.

Figure 3A:
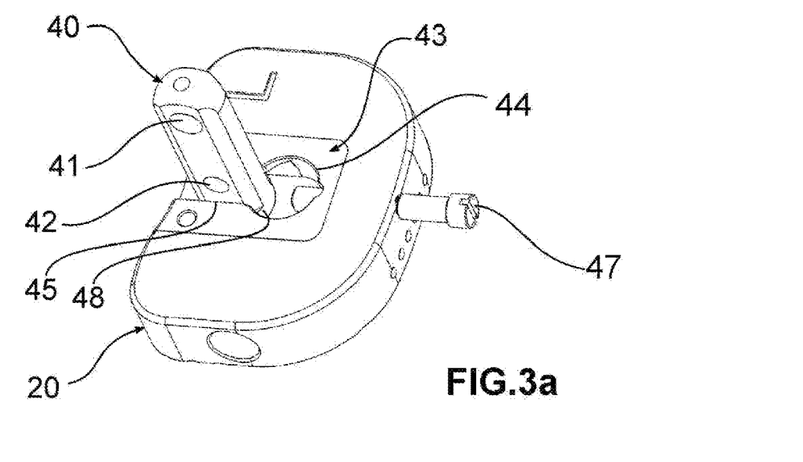
FIG. 3a is a representation of an embodiment of a joint section of a joint implant component with a mounted joint element.

The two joint implant components 1 and 1' are coupled together in an articulated manner. The joint sections 20 and 20' cooperate in such a manner that they can be pivoted relative to one another. In the embodiment example shown in FIG. 1, relative pivoting of the joint implant components 1 and 1' is enabled via a first joint element 30 and a second joint element 40 (see FIG. 3). A pivotability in the range of 0° to 100° starting from the stretched position is preferably provided.

Figure 3B:
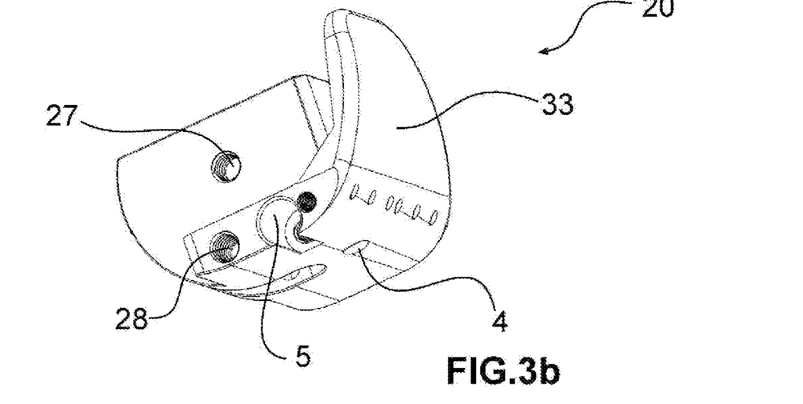

In the embodiment example shown in FIG. 1, the first joint element 30 is configured as a rod-shaped hinge pin, by means of which the joint implant components 1 and 1' form a hinged joint. As shown in FIG. 3*b*, the first joint element 30 may comprise a threaded portion 35. Via this threaded portion, the first joint element 30 can be attached to the joint section 20, which comprises a joint element receptacle 27 with a thread for this purpose.

However, the kinematics of the joint implant and the joint implant components 1 and 1' can also be adapted to other joints, such as the ball-and-socket joint of a shoulder joint implant or the ball-and-socket or enarthrodial joint of a hip joint implant.

Figure 3C:
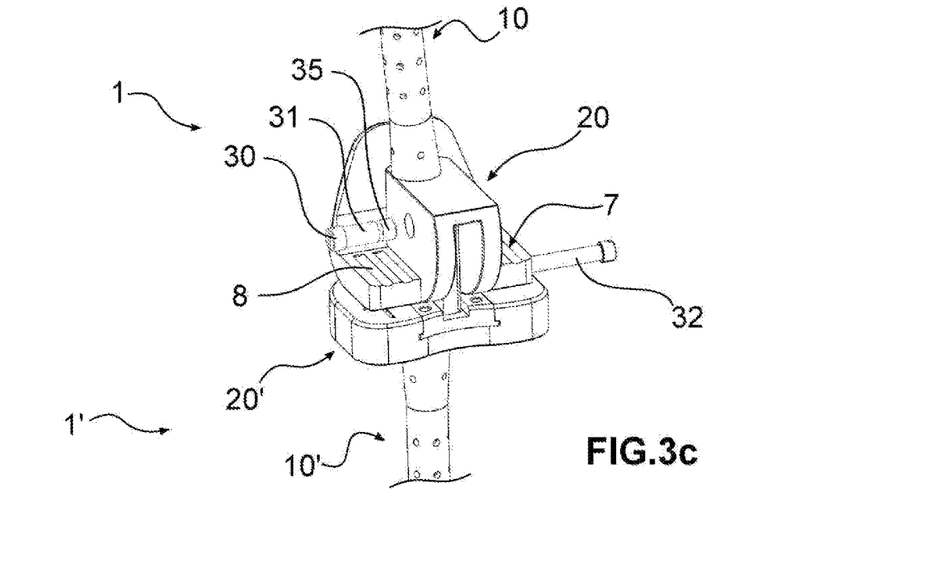
FIG. 3c is a three-dimensional view that shows the assembly of the joint section of a first joint implant component as shown in FIG. 3a together with the joint section of a second joint implant component as shown in FIG. 3b.

The knee joint implant shown in the figures may optionally be used as an arthrodesis implant by using an arthrodesis pin 32 (see FIG. 3*c*). In other words, the joint implant components 1 and 1' can be fixed as an arthrodesis implant by means of such an arthrodesis pin. The stiffening caused hereby immobilises the leg and thus protects it.

Figure 2:
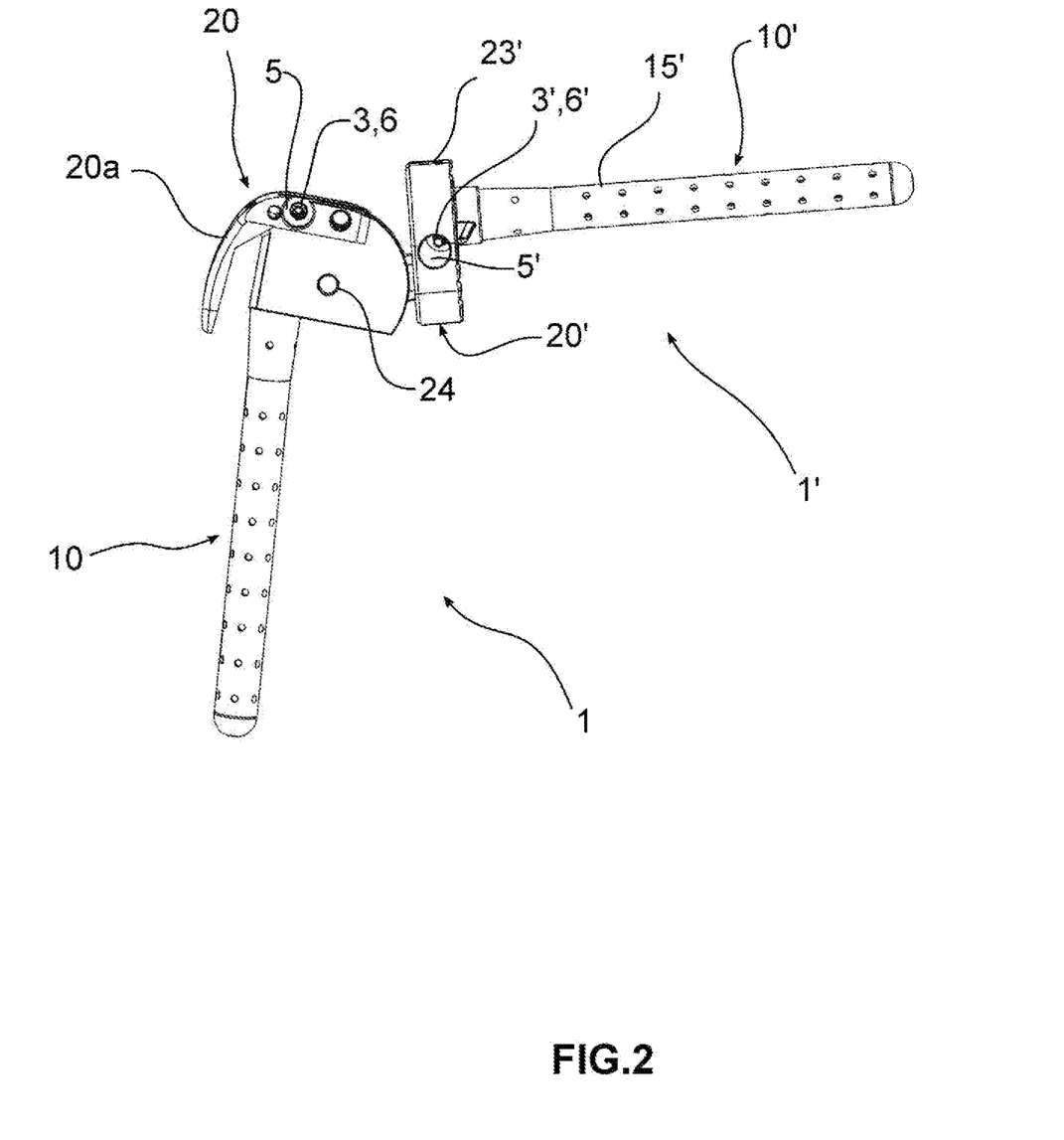
FIG. 2 shows a second embodiment of a joint implant in a flexed state for administration of a pharmaceutical product.

The joint implant component 1, 1' is furthermore preferably provided with at least one flush supply opening 3, 3', via which a fluid containing a pharmaceutical product can be introduced into the joint implant component 1, 1' (see FIG. 2). In the knee joint embodiment shown in FIG. 1, the flush supply opening 3, 3' is preferably provided laterally. In other words, the flush supply opening 3, 3' is located on the lateral or medial side in the implanted state.

Figure 4A:
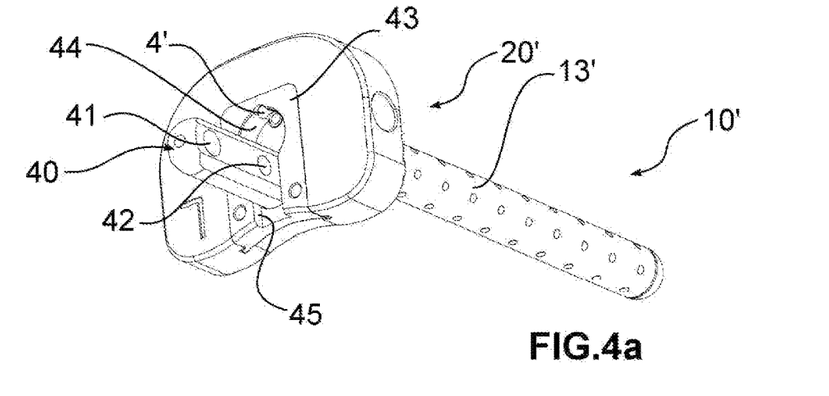
FIG. 4a is a three-dimensional view of one of the joint implant components shown in FIG. 3c.
Figure 4B:
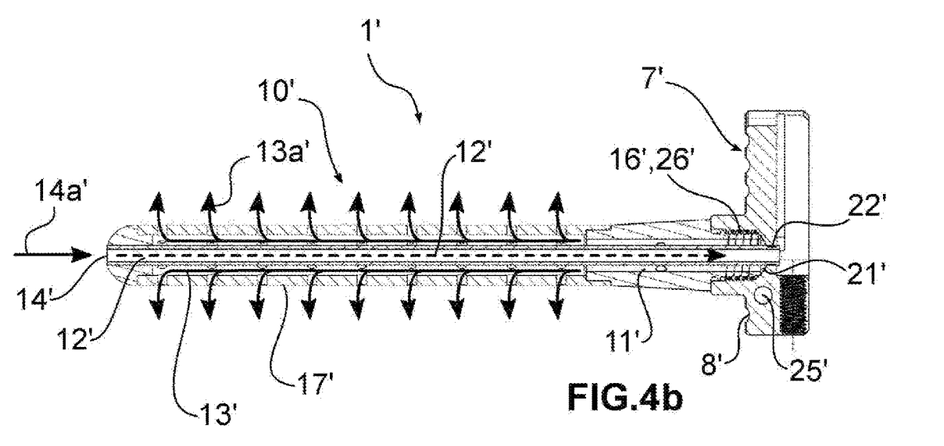
FIG. 4b is a sectional view of the joint implant component of FIG. 4a, which illustrates the discharge and return of a pharmaceutical product.
Figure 5A:
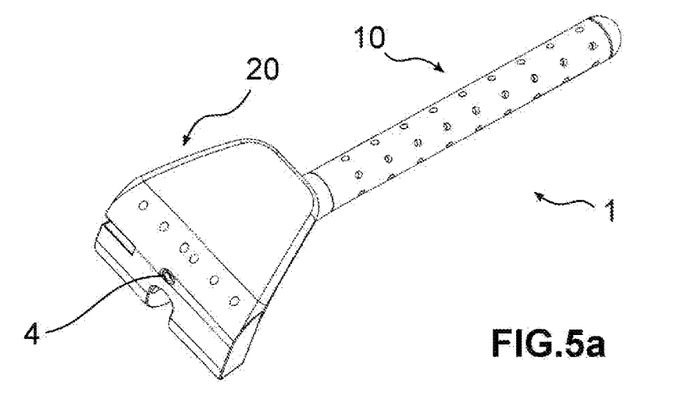
FIG. 5a is a three-dimensional representation of the other joint implant component shown in FIG. 3c.
Figure 5B:
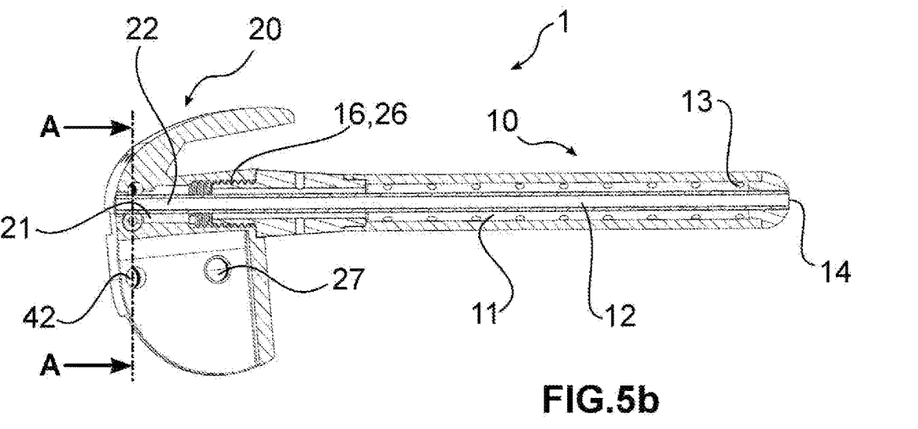
FIG. 5b is a sectional view of the joint implant component of FIG. 5a, which constitutes part of the channel system for discharge and return of a pharmaceutical product.

A backflush opening 4 is provided in the joint implant component 1, 1' for removal of drainage fluid (see FIGS. 4*a* and 5*a*).

The joint section 20, 20' may furthermore comprise joint section flush holes 23, 23'. The pharmaceutical product supplied via the flush supply openings 3, 3' can be discharged into the surrounding area of the implant at joint level via these joint section flush holes 23, 23'. For this purpose, the joint section 20, 20' comprises a channel system with corresponding branches 24, 24', which is described in more detail below (see FIGS. 4*c* and 5*c*).

The implant shaft 10, 10' adjoining the joint section 20, 20' has an elongated shape. In the distal region of the shaft 10, 10', a plurality of shaft flush holes 13, 13' are arranged around the circumference of the shaft 10, 10'. The shaft flush holes 13, 13' are fluidically connected to the flush supply opening 3, 3' so that a pharmaceutical product supplied via the flush supply opening 3, 3' can be discharged to the surrounding area of the implant shaft 10, 10' via the shaft flush holes 13, 13'. A shaft flush channel 11 is in particular formed in the shaft 10, 10' for this purpose, which is fluidically connected on its proximal side to the flush supply opening 3, 3' via a joint section flush passage 21, 21' (see FIGS. 4*b* and 5*b*). The shaft flush holes 13, 13' are preferably provided around the circumference of the implant shaft 10, 10' such that they discharge fluid to the outside of the implant shaft 10, 10' via substantially radial flow paths. In this manner, inflamed tissue, in particular bone tissue, in the vicinity of the shaft 10, 10' can be effectively treated by administering a pharmaceutical product.

A shaft backflush hole 14, 14' is furthermore located at the distal end of the shaft 10, 10' of the embodiment that is shown by way of example in FIG. 1. Alternatively, a plurality of shaft backflush holes 14, 14' may also be provided on the shaft 10, 10' in order to receive drainage fluid. However, a small number of shaft backflush holes 14, 14' and in particular only one shaft backflush hole 14, 14' is preferred in order to be able to carry out drainage in as targeted a manner as possible.

Since the shaft backflush hole 14, 14' is located at the distal end of the shaft 10, 10' and is thus not opposite any bone tissue, the drainage fluid can enter the shaft backflush channel 12, 12' in a targeted and simple manner (see FIGS. 4*b* and 5*b*). Since the shaft 10, 10' is intended to be implanted in a long bone, body fluid and residues of the supplied pharmaceutical product collect in particular in the medullary space of the long bone. It is therefore advantageous to provide the shaft backflush hole 14, 14' such that its backflush path 14*a*, 14*a*' passes through the medullary space of the long bone.

Once drainage fluid has entered the shaft 10, 10' via the shaft backflush hole 14, 14', it is transported in the shaft backflush channel 12, 12' within the shaft 10, 10' at the level of the joint section 20, 20' in the direction of the backflush opening 4, 4', where it can be discharged to the outside.

Figures 8A, 8B:
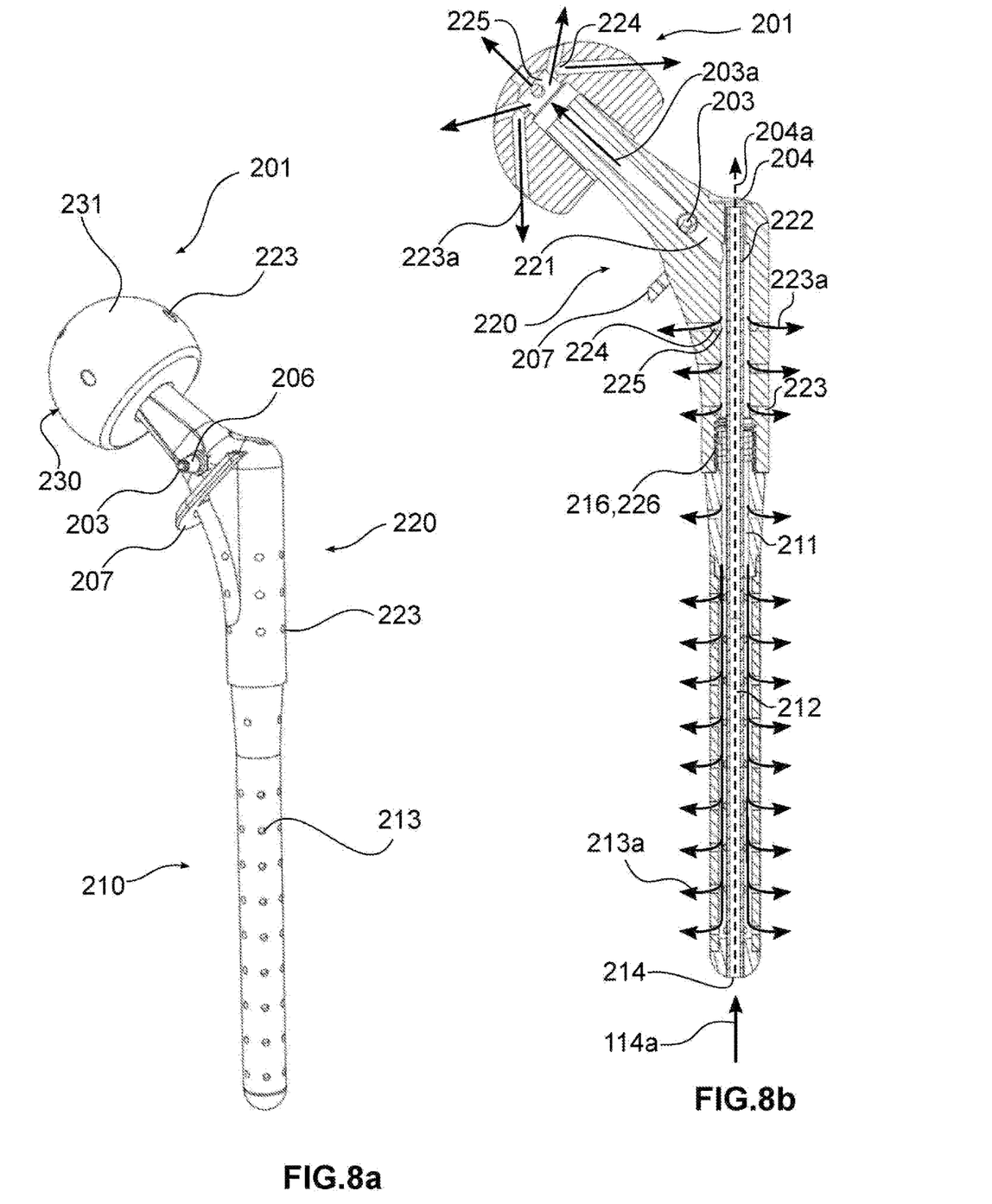
FIG. 8*a* is a three-dimensional view of another embodiment of a joint implant component for discharge and return of a pharmaceutical product.
FIG. 8*b* is a three-dimensional view of the internal channel system for discharge and return of a pharmaceutical product in the implanted state of the joint implant component.

As shown in FIGS. 4*b* and 5*b* and mentioned above, the shaft backflush hole 14, 14' is preferably configured such that the backflush path 14*a*, 14*a*' has a different orientation to each of the flush paths 13*a*' of the shaft flush holes 13, 13' (see also FIG. 8*b*). The backflush path 14*a* and the flush paths 13*a* are defined by the longitudinal axis of the shaft backflush hole 14 and the longitudinal axes of the shaft flush holes 13, 13', respectively.

As is furthermore apparent from FIG. 1, the implant component 1, 1' comprises an anchoring portion 7, 7', which serves to anchor the joint implant component 1, 1' in the bone tissue. The anchoring portion 7, 7' may be provided on the joint section 20, 20' (see FIGS. 1 to 6 and 8) and/or on the implant shaft 10, 10' (see FIG. 7).

For improved anchoring of the implant component 1, 1', the anchoring portion 7, 7' may comprise an anchoring structure 8, 8'. This anchoring structure 8, 8' may be configured to support anchoring of the joint implant component 1, 1' by means of a form fit.

The joint implant component 1, 1' is preferably anchored in a patient's bone tissue by means of bone cement. This has the above-described advantages of sealing the area of tissue to be treated in the direction of the joint section 20, 20' and of quickly and reliably fixing the joint implant component 1, 1' via the implant shaft 10, 10'.

For example, the embodiment of a joint implant shown in FIG. 1 comprises an anchoring portion 7, 7' with an anchoring structure 8, 8' that supports a form fit between the anchoring portion 7, 7' and the surrounding bone tissue. This serves to prevent an unintentional loosening of the implant component 1, 1'.

Figure 6A:
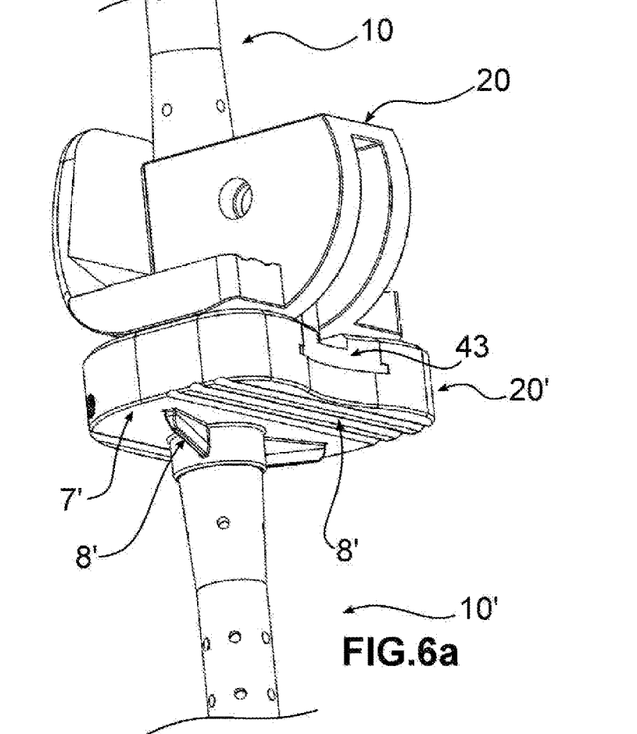
FIG. 6a and FIG. 6b show the structural features for anchoring the first and second joint sections of the joint implant shown in the previous figures.

As shown in FIG. 6*a*, the anchoring portion 7' of the joint section 20' may comprise an anchoring structure 8' with ribs and grooves for this purpose.

Figure 6B:
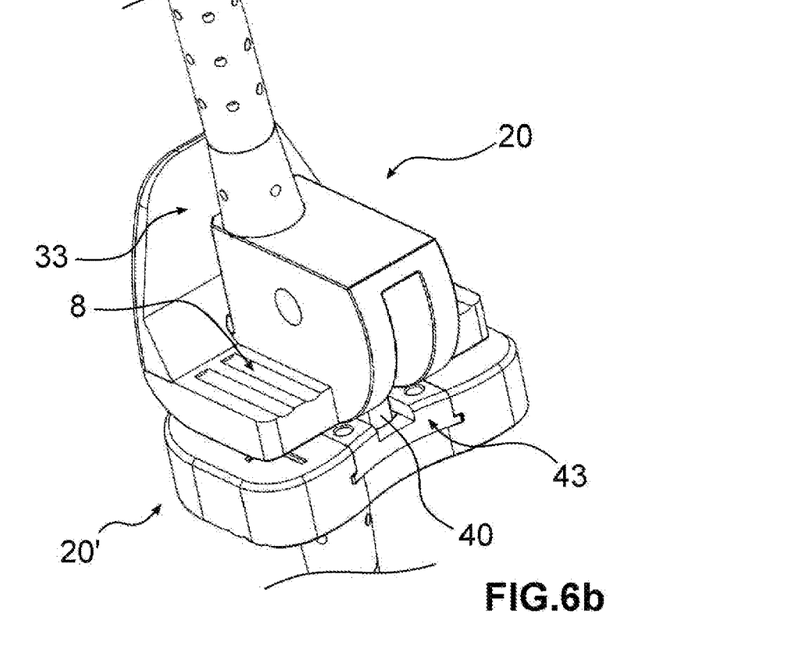

In the embodiment example shown by way of example in FIG. 6*b*, the joint section 20 also comprises an anchoring portion 7. The anchoring structure 8 thereof is supported by grooves. The anchoring structure 8 on the one hand increases the contact area for anchoring and on the other hand enables the form fit mentioned above.

It has been shown that anchoring in this manner is entirely sufficient for treatment with the disclosed joint implants. Since essentially no anchoring with bone cement occurs at the level of the shaft, the joint implant is relatively easy to remove and the bone tissue in the region of the shaft is protected.

In this regard, FIG. 7 shows a further embodiment of a joint implant component 101. In this joint implant component 1, an anchoring portion 107 is provided on the implant shaft 110, which may comprise an anchoring structure 108 that is preferably configured as at least one recess extending transverse to the direction of implantation. In the embodiment shown in FIG. 7, the anchoring structure 108 is formed in particular by circumferential grooves.

Referring again to FIG. 1, the outer diameter of the implant shaft 10, 10' is preferably selected such that it is smaller than the inner diameter of the long bone so as to avoid blockage of the shaft flush holes 13, 13' and to facilitate discharge of the pharmaceutical product via the shaft flush holes 13, 13'. The purpose of the implant shaft 10, 10' is therefore essentially to guide the joint implant component 1, 1' in a long bone and not to create a press fit for anchoring.

However, when an implant shaft 110 is anchored on its proximal side via an anchoring portion 107 as shown in FIG. 7, it is advantageous to adapt the diameter of the implant shaft 110 to the inner diameter of the long bone, taking into consideration a gap for the bone cement. For this reason, the diameter of the anchoring portion 107 located on the proximal side of the implant shaft 110 is preferably larger than the distal portion of the implant shaft 110 where the shaft flush holes 113 and the at least one shaft backflush hole 114 are located. As shown in FIG. 8, the implant shaft 10, 10' tapers in the direction from proximal to distal, preferably in a conical manner.

In FIG. 2, the embodiment of the joint implant is shown in a flexed state instead of in an extended state. The joint implant components 1, 1' of the joint implant preferably have a range of motion (ROM) in a range of 0° to 100°.

As described above, locking by means of an arthrodesis pin 32 may be provided in the joint implant. This locking is preferably carried out in a substantially extended position of the joint implant components 1, 1', i.e. in a position in a range of 0° to 10°, 0° to 5° and in particular 0°. For this purpose, the arthrodesis pin 32 is inserted into a locking hole 28 of the joint section 20 and an arthrodesis pin receptacle 42 of the other joint section 20' (FIGS. 1, 3*a* and 3*c*). The locking hole 28 and the arthrodesis pin are preferably provided with a thread in order to secure the arthrodesis pin 32 in the locked state.

The joint section 20 of the embodiment shown in FIG. 2 furthermore comprises a patella portion 33, along which a patella, if present, can slide. The patella portion may also assist with fixing the joint section 20 and may also protect the joint implant.

As shown in FIG. 2, for example, the flush supply openings 3, 3' of the joint implant components 1, 1' are preferably recessed in that the connection 6, together with the flush supply opening 3, 3', is received in a connection recess 5, 5'. As a result, the flush supply opening does not substantially protrude at the outer contour of the joint sections 20, 20'. Damage to the surrounding tissue by the structure of the flush supply openings 3, 3' can be prevented in this manner.

FIGS. 3a, 3b and 3c in particular show the articulated connection between joint sections 20 and 20' of joint implant components 1 and 1'. In the embodiment shown in these figures, the second joint element 40 of joint section 20' forms a hinged joint together with the first joint element 30 of joint section 20, as already mentioned above (see FIGS. 1 and 2).

For this purpose, a medial-lateral through-hole is provided in the second joint element 40, which forms the joint surface 42 of the second joint element 40 (see FIG. 3a). In the assembled state of the joint implant, the second joint surface 42 of the second joint element 40 interacts with a first joint surface 31 of the first joint element 30.

In the embodiment of a knee joint implant shown in FIGS. 3a, 3b and 3c, the first joint element 30 of joint section 20 is configured as a hinge pin. This can be passed through the second joint element 40 via the through-hole forming the second joint surface 41.

In order to assemble the joint sections 20 and 20', the through-hole of the second joint element 40 and the joint element receptacle 27 of the first joint element 30 are first of all aligned such that they are flush.

The first joint element 30 is then inserted and secured from one side into the joint element receptacle 27, through the through-hole of the second joint element 40 and into the joint element receptacle on the opposite side. As already described above, the first joint element is secured via the threaded portion 35 and a correspondingly configured thread of the joint element receptacle 27. As a result of this assembly, the joint element 30, when assembled, is located on opposite sides of the second joint element 40 in the joint element receptacle 27 of the joint section 20 and is secured thereto by means of the thread 35.

In the assembled state, the joint surface 31 of the first joint element 30 is in contact with the joint surface 41 of the second joint element 40. The joint surfaces 31 and 41 are hereby configured to work together as a hinged joint.

In the illustrated embodiment, the second joint element 40 is modular and comprises an insertion portion 48 for mounting thereof to the joint section 20. The insertion portion 48 may be inserted into a bearing recess 43 of the joint section 20 and retained therein.

For this purpose, the joint element holder 43 comprises an insertion opening 44 and a guide portion 45 in particular on the joint side or proximal side of the joint section 20'. The insertion opening 44 forms an opening into which the insertion portion 48 of the second joint element 40 can be inserted.

The guide portion 45, on the other hand, is configured as an elongated opening with an undercut, through which the insertion portion 48 of the second joint element 40 does not fit. However, the second joint element 40 is slidable along the guide portion 45. Accordingly, after insertion into the insertion opening 44, the second joint element 40 can be shifted along the guide portion 45 into a locking position. In this locking position, the second joint element 40 can no longer be removed from the joint element holder 43 in the direction opposite to its insertion direction owing to the geometry of the insertion portion 48. This is achieved by the undercut of the guide portion 45. In other words, the engagement between the insertion portion 48 of the second joint element 40 and the joint element holder 43 acts as a type of dovetail guide.

As shown in FIG. 3a, for example, a locking device 47 is preferably provided for locking the second joint element 40 in the joint element holder 43 of the joint section 20'. This locking device 47 prevents the insertion portion 48 of the second joint element 40 from moving back towards the insertion opening 44, and thus prevents the second joint element 40 from unintentionally coming out of the insertion opening 44.

In the embodiment shown in FIG. 3, the locking device 47 prevents the second joint element 40 from moving backwards by pressing the second joint element 40, preferably at the level of the insertion portion 48, against the end of the guide portion 45 which forms a stop. For this purpose, the locking device is configured as a threaded bolt or screw that engages a thread of the joint section 20' and/or the joint element holder 43.

In one possible embodiment, the locking device 47 may furthermore be engaged with the second joint element 40 so that the second joint element 40 may be moved back and forth via the locking device 47. This has the advantage that the position of the joint can be adjusted in the anterior-posterior direction. This allows an improved adjustment of the kinematics of the joint to the anatomical surroundings.

It is furthermore shown in particular in FIG. 4a that the joint element holder 43 may be configured as an insert that is mounted and fixed to the joint section 20'. This has the advantage that the joint element holder 43 may be made of a material with a higher strength, such as metal, so as to be able to achieve a secure connection to the second joint element 40. In such an embodiment, the body of the joint section 20' comprising the channel system may, by contrast, be made of a material that is easier to process, such as a polymer. It is also possible to produce the body of the joint section 20' using additive manufacturing methods. This also applies to the femoral joint section 20, which also contains a channel system and is illustrated inter alia in FIG. 5c.

Figure 4C:
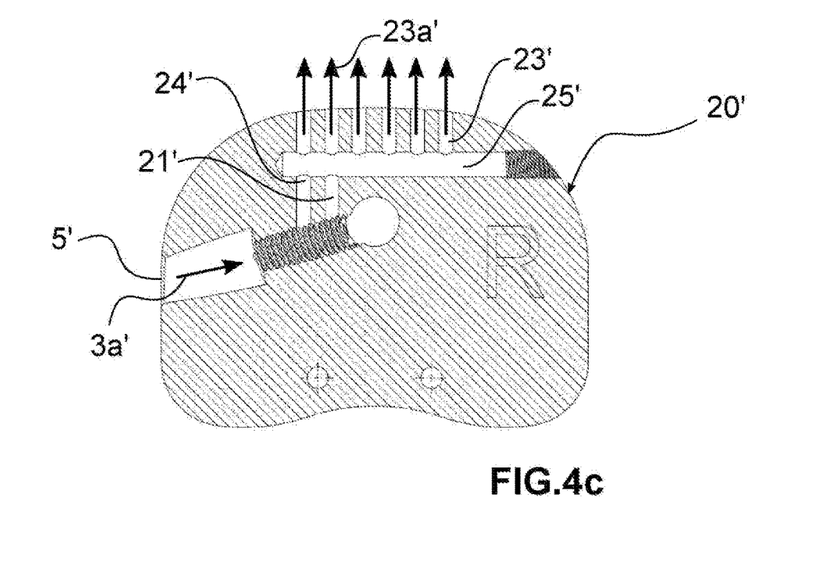
FIG. 4c is a sectional view of the joint section of the joint implant component of FIG. 4b at the level of the channel system for discharge and return of a pharmaceutical product.

FIG. 4c is a sectional view of a channel system for administering a pharmaceutical product inside the tibial joint section 20'. As described above, the joint section 20' may comprise a connection recess 5' for receiving the connection 6' shown in FIG. 2, which in turn comprises a flush supply opening 3'. As shown in FIG. 4c, the connection 6' is mountable via a thread in the joint section 20'. The connection 6' with the flush supply opening 3' is preferably configured such that it does not protrude from the outer contour of the joint section 20'.

A fluid containing the pharmaceutical product is guided through the at least one flush supply opening 3' into a joint section flush passage 21' that is fluidically connected to the proximal end of the shaft flush channel 11' (see FIG. 4b). As shown in FIG. 4c, at least one branch 24' may be provided between the proximal end of the shaft flush channel 11' and the at least one flush supply opening 3', which branch connects the joint section flush passage 21' to a plurality of joint section flush holes 23', preferably via a joint section distribution channel 25'. The joint section flush holes 23' are configured to discharge a pharmaceutical product into the surrounding area of the joint section 20' along a joint section flush path 23a'.

FIG. 4b illustrates, by means of the joint implant component 1', how the fluid containing the pharmaceutical product is discharged through the implant shaft 10' into the surrounding area thereof and how drainage fluid is received by the implant shaft 10' and returned to the joint section 20'.

Figure 5C:
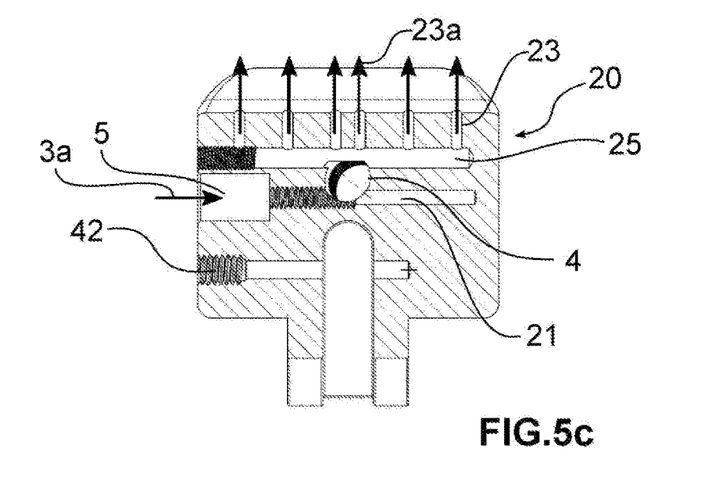
FIG. 5c is a sectional view of the joint section of the joint implant component of FIGS. 5a and 5b, which shows the channel system for discharge and return of a pharmaceutical product as well as part of an arthrodesis device.

It is clear to the person skilled in the art that the structure of the channel system of the tibial joint implant component 1' shown in particular in FIGS. 4b and 4c can substantially be applied to the channel system of the femoral joint implant component 1, which is shown in particular in FIGS. 5b and 5c.

As described above, the implant shaft 10, 10' comprises a shaft flush channel 11, 11' and a shaft backflush channel 12, 12' for fluid transport in the interior thereof. In the embodiment of the implant shaft 10, 10' shown in FIGS. 4b and 5b, the shaft backflush channel 12, 12' is configured as a tubular closed channel. The shaft backflush channel 12, 12' extends from the shaft backflush hole 14, 14' at the distal end of the implant shaft 10, 10' in particular centrally through the implant shaft 10, 10' to the proximal end thereof and, as shown, preferably beyond. As shown in FIGS. 4b and 5c, the shaft backflush channel 12, 12' may extend up to the proximal end of the joint section 20, 20'. In the shown embodiment example, the shaft backflush channel 12, 12' in the region of the implant shaft 10, 10' and the joint section backflush passage 22, 22' of the joint section 20, 20' are in particular configured integrally.

It is furthermore shown in FIGS. 4b and 5b that the shaft flush channel 11, 11' extends from the proximal end of the implant shaft 10, 10' in the interior thereof along the outside of the tubularly formed shaft backflush channel 12, 12'. In other words, the shaft flush channel 11, 11' is provided inside the implant shaft 10, 10' in the radial direction thereof between the outer wall of the implant shaft 10, 10' and the shaft backflush channel 12, 12'. The shaft flush channel 11, 11' preferably extends substantially (i.e. with the exception of possible support structures for the shaft backflush channel 11, 11') completely around the outer circumference of the shaft backflush channel 12, 12'.

The arrangement around the shaft backflush channel 12 allows for a uniform supply of fluid to the shaft flush holes 13, 13', in particular in the region of the shaft flush channel 11, 11' where the shaft flush holes 13, 13' extend through the outer wall 17, 17' of the implant shaft 10, 10'. These discharge the pharmaceutical product to the outside along shaft flush paths 13a, 13a'.

In the embodiment example of the implant shaft 10, 10' of FIGS. 4b and 5b, the entire section of the shaft flush channel 11, 11' in which the shaft flush holes 13, 13' are located is formed as an annular cavity due to the anchoring of the shaft backflush channel 12, 12' at the distal end of the implant shaft 10, 10' and the proximal end of the joint section 20, 20'.

The shaft flush channel 11, 11' is supplied with fluid via the joint section flush passage 21, 21' of the joint section 20, 20'. The fluid is then conveyed along the tubular shaft backflush channel 12, 12' and discharged via the shaft flush holes 13, 13' in the direction of the flush paths 13a'. The flush paths 13a' are indicated in FIG. 4b by the arrows extending substantially radially away from the implant shaft 10.

As shown in the figures, the shaft flush holes 13, 13' are preferably evenly distributed around the circumference and along the longitudinal direction of the implant shaft 10, 10'. Fluid supplied via the joint section flush passage 21, 21' and the shaft flush channel 11, 11' is accordingly discharged via the discharge holes 13, 13' in the outer wall 17, 17' into the surrounding area of the implant shaft 10, 10' along substantially its entire length. As described above, the shaft flush holes 13, 13' may have different cross-sections for this purpose in order to bring about a more uniform discharge. For this purpose, the cross-sectional area of the individual discharge holes 13, 13' may in particular increase from the proximal end to the distal end of the implant shaft 10, 10'.

In addition to such a discharge of a pharmaceutical product, drainage fluid may be removed from the distal surrounding area of the implant shaft 10, 10' via the shaft backflush hole 14, 14' and the shaft backflush channel 12, 12' of the implant shaft. For this purpose, drainage fluid enters the shaft backflush channel 12' substantially along the backflush path 14a'. It should be noted that the backflush paths and flush paths indicated by arrows in the figures indicate the directions defined by the corresponding openings and holes, and correspond substantially to a predetermined main flow direction.

The different orientation of the backflush path 14a' relative to the flush paths 13a' promotes a broad supply of pharmaceutical product to the surrounding area of the implant shaft 10, 10', as already explained above.

Comparable to FIG. 4c for the case of the tibial joint implant component 1, FIG. 5c shows for the femoral joint implant component 1 how the pharmaceutical product is introduced into the joint section 20 via a flush supply path 3a and is released in the region of the joint section 20, partly via joint section flush holes 23, into the surrounding area of the joint implant component 1 to the tissue located there. For this purpose, fluid is supplied via the flush supply opening 3 in the connection 6 that is shown in FIG. 2. The connection 6 is preferably configured for attachment of a tube or for coupling with a connector, such as a Luer connector. As already described above, the connection 6 with the flush supply opening 3 is preferably located in a connection recess 5 made laterally in the joint section 20 so that the connection 6 is recessed and in particular does not protrude beyond the outer contour of the joint section 20. This prevents damage to surrounding tissue in the implanted state.

The fluid containing a pharmaceutical product is fed via the flush supply opening 3 along the flush supply path 3a into the channel system inside the joint section 20. There, the fluid is guided through the joint section flush passage 21 to the shaft flush channel 11 shown in FIG. 5b and is branched off from the joint section flush passage 21 via a branch (not shown) inside the joint section 20. The branched-off portion of the fluid is then guided to the joint section flush holes 23, in particular via a joint section distribution channel 25. The remaining fluid is transported to the shaft flush holes 13 via the shaft flush channel 11 so as to be discharged into the surrounding area of the implant shaft 10.

It is furthermore apparent from FIGS. 4a, 4b, 5a and 5b how the drainage fluid received via the shaft backflush hole 14, 14' into the shaft backflush channel 12, 12' is discharged on the proximal side of the joint section 20, 20' via a backflush opening 4, 4' of the joint implant component 1, 1', i.e. in this example from joint section 20, 20'. Even though the figures show drainage fluid being discharged on the proximal side, it is also possible to discharge drainage fluid laterally. The drainage fluid may then be actively or passively removed from the patient's body through a drainage tube located in the region of the joint section.

FIGS. 8a and 8b show a further embodiment of a joint implant component 201. This is a joint implant component 201 for replacing a femoral joint implant component of such a joint implant. As is apparent from the figures, the structure of the joint implant component 201, as will be briefly described below, is substantially the same as the structure of the joint implant components 1, 1' and 101 described above.

For example, the joint implant component 201 comprises an implant shaft 210 and a joint section 220, which are coupled together via connecting portions 216 and 226. These connecting portions 216 and 226 may be configured as described above.

The joint section 220 comprises a flush supply opening 203 as part of a connection 206. A fluid containing a pharmaceutical product as described above may be supplied via the flush supply opening 203. This pharmaceutical product is supplied within the joint section 220 to the shaft flush channel 211 of the implant shaft 210 via a joint section flush passage 221.

The joint section 220 furthermore comprises joint section distribution channels 225 leading to joint section flush holes 223, via which a portion of the supplied fluid can be discharged along joint section flush paths 223*a* into the surrounding area of the joint section 120. As shown in FIG. 8*b*, branches 224 are provided for this purpose, which, for example, branch off a portion of the fluid located in the joint section flush passage 221 into the joint section distribution channels 225 and joint section flush holes 223.

A first joint element 230 having a first joint surface 231 is also attached to the joint section 220. The femoral head is preferably mounted via a conical connection as shown. The joint element 230 may form a functional ball-and-socket joint with an opposing acetabulum.

In contrast to the embodiments described above, the channel system for discharging a pharmaceutical product also extends into the joint element 230. It is in particular guided to joint section flush holes 223 via the joint section flush passage 221 and a joint section distribution channel 225 as well as branches 224. The joint section flush holes 223 are provided in the femoral head and are intended to discharge the pharmaceutical product along joint section flush paths into the surrounding area of the joint, and thus also into the surrounding area of the acetabulum.

As already mentioned above, the pharmaceutical product is also supplied to the implant shaft 210 via the shaft flush channel 211. Shaft flush holes 213 are provided along the implant shaft 210 and along the circumference thereof, via which the pharmaceutical product can be discharged along flush paths 213*a* into the surrounding area of the implant shaft 210.

Similar to the knee joint implant described above, the implant shaft 210 also comprises a shaft backflush hole 214 at its distal end. The shaft backflush hole 214 is provided to guide drainage fluid along the backflush path 214*a* into the shaft backflush channel 212. As in the previous embodiments, the shaft backflush channel is tubular and configured integrally with the joint section backflush passage 222. A backflush opening 204 is located on a proximal side of the joint section 220, via which drainage fluid can be discharged along a backflush path 204*a*.

An anchoring portion 207 in the form of a collar is provided for anchoring the joint implant component 201 in the bone tissue of a patient. The anchoring portion 207 may be modular and mountable, as shown in FIGS. 8*a* and 8*b*. It is alternatively also possible to configure the anchoring portion integrally with the joint section 220. As in the case of the embodiments described in FIGS. 1 to 6, a relatively small area is also sufficient here to fix the joint implant in place for the duration of the treatment and to remove it again carefully. Removability is also simplified by the fact that the attachment plane of the implant extends transverse to the long bone and is thus easily accessible for removal of the implant.

The present disclosure can therefore be applied to joint implants with different degrees of freedom in order to be able to treat inflammations more effectively.

REFERENCE NUMBERS

In the enclosed figures, the following reference numbers refer to the following features of the above-described embodiments. Reference is made above to different embodiments by means of a preceding numeral that is not listed below. The apostrophe used above is also not listed below. It refers to features having the same function and/or structure within a joint implant that comprises two joint implant components forming a joint.

1 Joint implant component
  3 Flush supply opening
  3*a* Flush supply path
  4 Backflush opening
  4*a* Backflush path
  5 Connection recess
  6 Connection
  7 Anchoring portion
  8 Anchoring structure
  10 Implant shaft
  11 Shaft flush channel
  12 Shaft backflush channel
  13 Shaft flush hole
  13*a* Shaft flush path
  14 Shaft backflush hole
  14*a* Backflush path
  16 Connecting portion
  17 Outer wall
  18 Surface structure
  20 Joint section
  21 Joint section flush passage
  22 Joint section backflush passage
  23 Joint section flush hole
  23*a* Joint section flush path
  24 Branch
  25 Joint section distribution channel
  26 Connecting portion
  27 Joint element receptacle
  30 First joint element
  31 First joint surface
  32 Arthrodesis pin
  33 Patella portion
  35 Threaded portion of the first joint element
  40 Second joint element
  41 Second joint surface
  42 Arthrodesis pin receptacle
  43 Joint element holder
  44 Insertion opening
  45 Guide portion
  46 Joint base plate
  47 Locking device
  48 Insertion portion

The invention claimed is:

1. A joint implant component for administering a pharmaceutical product, comprising an implant shaft, a joint section arranged at a proximal end of the implant shaft, a flush supply opening and a backflush opening, wherein:
    a connection with the flush supply opening is in a connection recess made laterally in the joint section, wherein the connection is set back and does not protrude beyond an outer contour of the joint section, said implant shaft comprises a shaft flush channel and a shaft backflush channel extending along the implant shaft inside the implant shaft, said shaft flush channel is connected to the outside of the implant shaft via shaft flush holes for discharging the pharmaceutical product, and the shaft backflush channel is connected to the outside of the implant shaft via at least one shaft backflush hole for receiving the discharged pharmaceutical product, the flush supply opening is fluidically connected to the proximal end of the shaft flush channel, the backflush opening is fluidically connected to the proximal end of the shaft backflush channel, and wherein the flush supply opening is provided in the joint section and the joint section comprises a joint section flush passage connecting the flush supply opening to the shaft flush channel, the joint section comprising joint section flush holes connected to the flush supply opening, wherein the joint section flush passage comprises at least one branch that connects the flush supply opening to the joint section flush holes.

2. The joint implant component according to claim 1, wherein the implant shaft and the joint section each comprise a connecting portion provided with a thread, by means of which they can be mounted together.

3. The joint implant component according to claim 2, wherein the at least one shaft backflush hole defines a backflush path and each shaft flush hole defines a flush path, the backflush path having a different orientation than the flush path with orientations differing by at least 45° to 90°.

4. The joint implant component according to claim 3, wherein the joint implant component comprises an anchoring portion proximal to the shaft flush holes, which comprises an anchoring surface.

5. The joint implant component according to claim 4, wherein the surface of the anchoring portion comprises a surface structure of ribs or grooves.

6. The joint implant component according to claim 1, wherein the backflush opening is provided in the joint section and the joint section comprises a joint section backflush passage connecting the backflush opening to the shaft backflush channel.

7. The joint implant component according to claim 1, wherein the joint section flush passage comprises at least one branch that connects the flush supply opening to the shaft flush channel.

8. The joint implant component according to claim 7, wherein the joint section flush passage has different cross-sectional areas for controlling the distribution of the pharmaceutical product between the shaft flush channel and the joint section flush holes.

9. The joint implant component according to claim 8, wherein the shaft flush holes have different cross-sectional areas to one another.

10. The joint implant component according to claim 1, wherein the joint section comprises an attachable joint element.

11. A joint implant comprising two joint implant components according to claim 1, wherein the first joint implant component comprises a first joint surface and the second joint implant component comprises a second joint surface, and the joint surfaces of the first and second joint implant components are complementary to one another and are pivotable relative to one another when in contact with each other.

12. The joint implant according to claim 10, wherein the first joint surface or the second joint surface is configured as part of a first or second attachable joint element.

13. The joint implant according to claim 12, wherein one of the joint implant components comprises an arthrodesis pin and the other of the joint implant components comprises an arthrodesis pin receptacle, the arthrodesis pin being insertable into the arthrodesis pin receptacle to lock the joint implant components in an extended position.

14. The joint implant according to claim 13, wherein the second joint element comprises an insertion portion that is insertable into an insertion opening and a guide portion comprising an undercut, the insertion opening and the guide portion being formed in the second joint implant component on a side facing the first joint implant component, and the second joint implant component comprising a locking device that locks the insertion portion inserted into the guide portion.

15. The joint implant component according to claim 2, wherein the connecting portion is threaded.

16. The joint implant component according to claim 1, further comprising a joint section distribution channel, wherein the flush supply opening is connected to the joint section flush holes via both the joint section distribution channel and the joint section flush passage, and wherein the joint section distribution channel has a different cross-section as compared to the joint section flush holes.

* * * * *